(12) United States Patent
Hansmann

(10) Patent No.: US 11,162,470 B2
(45) Date of Patent: Nov. 2, 2021

(54) ENERGY HARVESTING FROM MOVING FLUIDS USING MASS DISPLACEMENT

(71) Applicant: Carl Ludwig Hansmann, Scarborough (ZA)

(72) Inventor: Carl Ludwig Hansmann, Scarborough (ZA)

(*) Notice: Subject to any disclaimer, the term of this patent is extended or adjusted under 35 U.S.C. 154(b) by 0 days.

(21) Appl. No.: 16/307,992

(22) PCT Filed: May 13, 2017

(86) PCT No.: PCT/IB2017/052833
§ 371 (c)(1),
(2) Date: Dec. 7, 2018

(87) PCT Pub. No.: WO2017/212356
PCT Pub. Date: Dec. 14, 2017

(65) Prior Publication Data
US 2019/0218737 A1    Jul. 18, 2019

(30) Foreign Application Priority Data

Jun. 7, 2016   (ZA) .................................. 2016/03876
Dec. 2, 2016   (ZA) .................................. 2016/08350

(51) Int. Cl.
*F03B 13/00*    (2006.01)
*F03B 17/06*    (2006.01)
(Continued)

(52) U.S. Cl.
CPC .............. *F03B 17/06* (2013.01); *F03B 13/12* (2013.01); *E02B 9/08* (2013.01); *F03D 3/002* (2013.01);
(Continued)

(58) Field of Classification Search
CPC .. E02B 9/08; F03B 13/12; F03B 17/04; F03B 17/06; F03D 3/002; F03D 9/008; F05B 2240/915; F05B 2240/93; F05B 2250/231
(Continued)

(56) References Cited

U.S. PATENT DOCUMENTS 3,360,926 A * 1/1968 Parr ........................ F03B 17/02
                                                       60/496
3,412,482 A * 11/1968 Kusmer ................... F03B 17/04
                                                       434/300
(Continued)

FOREIGN PATENT DOCUMENTS

CN    103615352 B    3/2016
GB    2213533 A  *  8/1989 .............. F03B 17/02
(Continued)

OTHER PUBLICATIONS

International Search Report dated Aug. 14, 2017 for International Application No. PCT/IB2017/052833 filed May 13, 2017.

*Primary Examiner* — Julio C. Gonzalez
(74) *Attorney, Agent, or Firm* — Blue Filament Law PLLC

(57) ABSTRACT

Energy is harvesting from fluids with different densities, such as water (34) and air (38) with a rotor (12) that is selectively above and below a water surface (30). The rotor (12) has cavities (31,32) inside tubes (18) with apertures (24) in walls (22) of the tubes (18). In a submerged mode, with the rotor (12) in the water (34), air is trapped in tubes (18) on one side of the rotor (12), which has apertures (24) facing down and air is released from the tubes (18) on the opposite side of the rotor (12), which has apertures (24) facing up. The opposite happens in an elevated mode.

17 Claims, 7 Drawing Sheets

(51) Int. Cl.
*F03B 13/12* (2006.01)
*F03D 9/00* (2016.01)
*F03D 3/00* (2006.01)
*E02B 9/08* (2006.01)

(52) U.S. Cl.
CPC ........ *F03D 9/008* (2013.01); *F05B 2250/231* (2013.01); *Y02E 10/20* (2013.01)

(58) Field of Classification Search
USPC ................... 290/43, 54; 416/7, 8, 85; 415/7
See application file for complete search history.

(56) References Cited

U.S. PATENT DOCUMENTS

| | | | | |
|---|---|---|---|---|
| 3,934,964 A * | 1/1976 | Diamond | ................ | F03B 17/04 415/7 |
| 4,151,719 A * | 5/1979 | Boots | ..................... | F03B 7/006 415/5 |
| 4,260,902 A * | 4/1981 | Crider | ....................... | F03B 3/08 290/43 |
| 4,333,311 A | 6/1982 | Kitabayashi | | |
| 4,385,497 A * | 5/1983 | Scott | ....................... | F03B 7/003 415/916 |
| 4,440,427 A * | 4/1984 | Felton | ..................... | F03B 7/003 290/54 |
| 6,237,342 B1 * | 5/2001 | Hurford | ................... | F03G 3/00 60/721 |
| 6,764,275 B1 * | 7/2004 | Carr | ........................ | F03B 17/04 415/1 |
| 7,586,207 B2 * | 9/2009 | Sack | ...................... | F03B 13/14 290/53 |
| 8,362,631 B2 | 1/2013 | Roe et al. | | |
| 2002/0067989 A1 * | 6/2002 | Thien | ..................... | F03B 17/04 416/7 |
| 2002/0149204 A1 * | 10/2002 | Rauschenberger | ..... | F03B 17/04 290/1 R |
| 2006/0156718 A1 * | 7/2006 | Petkovic | ................ | F03B 17/02 60/496 |
| 2008/0197637 A1 * | 8/2008 | Dos Santos | ............ | F03B 17/04 290/54 |
| 2009/0146428 A1 | 6/2009 | Sack | | |
| 2010/0001536 A1 * | 1/2010 | Pace | .................... | F03B 17/005 290/1 R |
| 2010/0146961 A1 * | 6/2010 | Silva | ...................... | F03B 17/04 60/495 |
| 2012/0211987 A1 * | 8/2012 | Roe | ........................ | F03B 13/16 290/53 |
| 2015/0211381 A1 * | 7/2015 | Torrent | ................... | F03B 17/04 290/1 A |
| 2015/0226079 A1 * | 8/2015 | Nikornpan | .............. | F03B 17/04 290/52 |

FOREIGN PATENT DOCUMENTS

| | | | |
|---|---|---|---|
| JP | 56-034971 | 4/1981 | |
| WO | WO-2004094815 A1 * | 11/2004 | ............ F03B 13/184 |
| WO | 2012071594 A2 | 5/2012 | |

* cited by examiner

ENERGY HARVESTING FROM MOVING FLUIDS USING MASS DISPLACEMENT

FIELD OF THE INVENTION

This invention relates to the harvesting of energy in usable formats, including but not limited to, useful mechanical energy and/or electricity, from bodies of moving fluids, including flowing fluids such as rivers, currents, winds and tidal flows, as well as fluids moving vertically in gravitational fields, such as wave action and tidal variations. The list or fluids that can serve as energy source is not exhaustive.

BACKGROUND TO THE INVENTION

Global warming, depletion of fossil fuels and other factors have increased the need for renewable energy sources and, while various means have been developed to harvest energy from flowing fluids such as wind and rivers, using turbines, there are still enormous sources of renewable energy that are not being harvested commercially.

The present invention seeks to provide means for harvesting such energy sources, particularly including harvesting energy from fluids that move vertically in relation to gravity. By such vertical movement of fluids is not only meant vertical flows, but also movement in which the boundaries between fluids move vertically, e.g. tides and waves, where the elevation of a surface between two fluids with different densities (e.g. water and air), changes.

The present invention further seeks to combine multiple modes of harvesting energy from moving fluids, simultaneously and/or consecutively.

SUMMARY OF THE INVENTION

According to a first aspect of the present invention there is provided apparatus for harvesting energy from fluids, said apparatus comprising;
  a rotor; and
  a support structure supporting said rotor to rotate about a generally horizontal rotational axis in a rotation direction, said support structure being configured such that said rotational axis is selectively above and below a boundary between two fluids of different density;
  said rotor defining at least a first cavity at a first radial orientation relative to the rotational axis and a second cavity at a second radial orientation relative to the rotational axis, each of said first cavity and said second cavity being spaced from the rotational axis, and said first radial orientation being spaced from said second radial orientation in the rotation direction;
  wherein said rotor defines a first trailing aperture extending from the first cavity in a direction opposite to the rotation direction, to an outside of the rotor, and a second trailing aperture extending from the second cavity in a direction opposite to the rotation direction, to the outside of the rotor.

The two fluids may be water and air with the water surface forming the boundary between them and the rotational axis may be selectively above and below the water surface. The water surface may be subject to wave action and/or tidal action and the rotational axis may be at an elevation that causes it to be selectively above and below the water surface as a result of the wave action and/or tidal action.

The first radial orientation and the second radial orientation may be diametrically opposed about the rotational axis.

The rotor may define more than two of the cavities and the cavities may be at different radial orientations in the rotation direction, about the rotational axis.

The rotor may include a plurality of hollow elements and each of the cavities may be defined inside one of said hollow elements. A plurality of the hollow elements may be arranged within the rotor, to form vanes. Each of the hollow elements may have a wall surrounding the cavity defined within the hollow element, at least in part, and the trailing aperture of the cavity may be defined within the wall.

The apparatus may include valves that are configured to open and close the first and second trailing apertures, selectively.

The rotor may define a first leading aperture extending from the first cavity in the rotation direction, to the outside of the rotor, and a second leading aperture extending from the second cavity in the rotation direction, to the outside of the rotor. The apparatus may include valves that are configured to open and close the first and second leading apertures, selectively.

According to another aspect of the present invention there is provided a method of harvesting energy from fluids, said method comprising:
  providing the apparatus as described herein above;
  supporting the rotor with its rotational axis sequentially above and below the boundary between the two fluids of different density, the rotor being in a submerged position when its rotational axis is below the boundary and in an elevated position when its rotational axis is above said boundary;
  while the rotor is in the submerged position:
    positioning the rotor with the first cavity and the second cavity below the boundary and with the first trailing aperture directed upwards and the second trailing aperture directed downwards;
    holding the lower density fluid captive inside the second cavity and thereby maintaining a buoyant force exerted by the lower density fluid in the second cavity;
    allowing the lower density fluid to escape from the first cavity and the higher density fluid to enter the first cavity, via the first trailing aperture, thereby increasing the overall density of contents inside the first cavity and reducing a buoyant force exerted by the contents of the first cavity;
    exerting a moment on the rotor in the rotation direction, by virtue of the maintained buoyant force exerted by the lower density fluid in the second cavity and the reduced buoyant force exerted by the contents of the first cavity; and
  while the rotor is in the elevated position:
    positioning the rotor with the first cavity and the second cavity above the boundary and with the first trailing aperture directed upwards and the second trailing aperture directed downwards;
    holding the higher density fluid captive inside the first cavity and thereby maintaining a gravitational force exerted by the higher density fluid in the first cavity;
    allowing the higher density fluid to escape from the second cavity and the lower density fluid to enter the second cavity, via the second trailing aperture, thereby reducing the overall density of contents inside the second cavity and reducing a gravitational force exerted by the contents of the second cavity;
    exerting a moment on the rotor in the rotation direction, by virtue of the maintained gravitational force exerted by the higher density fluid in the first cavity and the reduced gravitational force exerted by the contents of the second cavity.

The method may include exposing the rotor to a fluid flow which impinges on the rotor, so that the impinging fluid flow exerts a force on the rotor in an impingement direction that causes a moment on the rotor in the rotation direction. The method may include directing the fluid flow to impinge on the rotor in the impingement direction.

The impinging fluid flow may be a flow of the low density fluid and the impinging fluid flow may impinge the rotor above the rotational axis, e.g. the low density fluid may be air and the impinging fluid flow may be wind.

The impinging fluid flow may be a flow of the high density fluid and the impinging fluid flow may impinge the rotor below the rotational axis, e.g. the high density fluid may be water and the impinging fluid flow may be water moving by wave action, in a tidal flow and/or under gravity.

The rotor may include valves that are configured to open and close the first and second leading apertures, selectively, and the method may include:
  selectively opening the first leading aperture while the rotor is in the submerged position; and
  selectively opening the second leading aperture while the rotor is in the elevated position.

The rotor may include valves that are configured to open and close the first and second leading apertures and the first and second trailing apertures, selectively, and the method may include opening the leading apertures and closing the trailing apertures, selectively, to invert the rotation direction.

According to a further aspect of the present invention, there is provided apparatus for harvesting energy from fluids, said apparatus comprising;
  a rotor; and
  a support structure supporting said rotor submerged in a body of high density fluid to rotate about a generally horizontal rotational axis in a rotation direction,
  said rotor defining a plurality of cavities at different radial orientations relative to the rotational axis in the rotation direction, and each of said cavities being spaced from the rotational axis;
  wherein each said cavity defines at least one aperture that is open to the body of high density fluid, with a aperture valve for selectively closing said aperture; and
  wherein said rotor defines a plurality of separate internal passages, each said passage being in flow communication with one of said cavities and with a drain channel, with a plurality of separate passage valves, each passage valve being configured for selectively closing one of said passages;
  said drain channel having an inlet that is selectively in communication with the passages and an outlet to a body of low density fluid, at an elevation that is not higher than the rotational axis.

Each cavity may define two of said apertures, being a leading aperture and a trailing aperture, with a leading aperture valve and a trailing aperture valve, for selectively closing the leading aperture and the trailing aperture, respectively.

According to yet a further aspect of the present invention there is provided a method of harvesting energy from fluids, said method comprising providing the apparatus as described herein above and allowing the rotor to rotate in its rotation direction; for each cavity and the channel in communication with said cavity:
  for at least part of the period when said cavity rotates from a position generally at the same elevation as the rotational axis, to the top of the rotor, closing the aperture valve of said cavity and opening the passage valve of said passage, to allow the high density fluid to drain from the cavity via the passage and the drain channel, and allowing low density fluid to enter the cavity via the drain channel and passage; and
  for at least part of the period when said cavity rotates from the top of the rotor to the bottom of the rotor, closing the passage valve and opening the aperture valve to allow low density fluid to escape from the cavity and allow high density fluid to enter the cavity.

The method may include, for each cavity and the channel in communication with said cavity, for at least part of the period when said cavity rotates from the top of the rotor to the bottom of the rotor, opening the leading aperture valve and the trailing aperture valve of said cavity, to allow low density fluid to escape from the cavity through the trailing cavity and allow high density fluid to enter the cavity through the leading aperture.

BRIEF DESCRIPTION OF THE DRAWINGS

For a better understanding of the present invention, and to show how it may be put into effect, the invention will now be described by way of non-limiting example, with reference to the accompanying drawings in which.

DETAILED DESCRIPTION OF THE DRAWINGS

Figure 1:
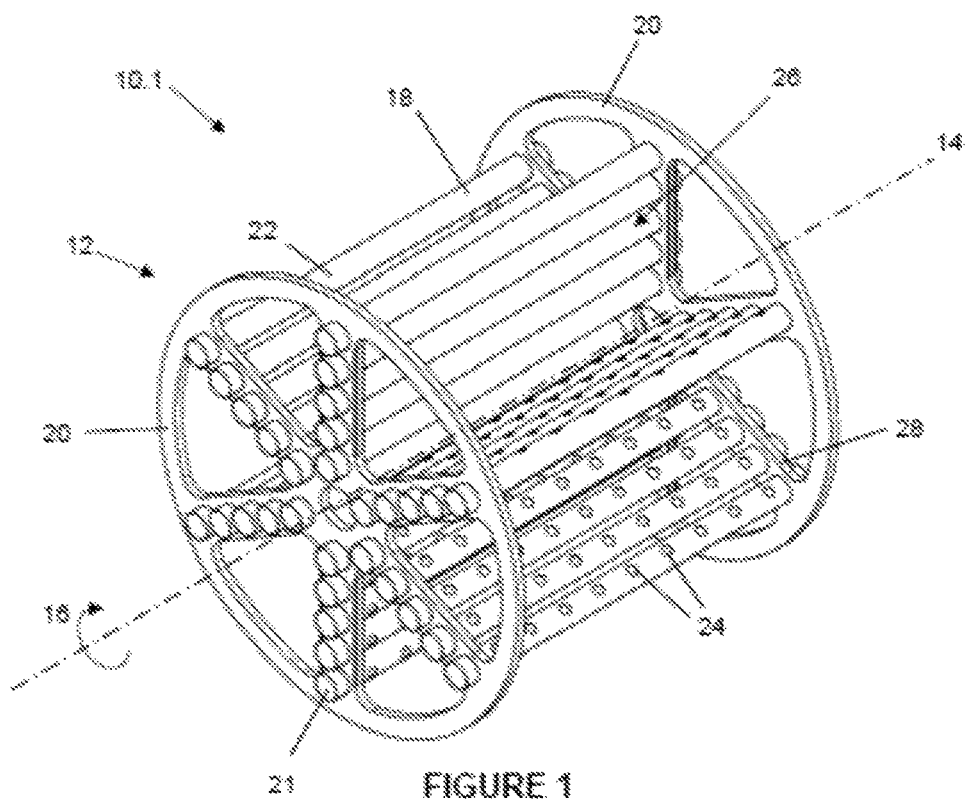
FIG. 1 shows a three-dimensional view of a first embodiment of apparatus according to the present invention.

Referring to the drawings, apparatus for harvesting energy from fluids according to the present invention is identified, generally, by reference numeral 10. Features that are common between different embodiments of the invention are identified by like reference numerals. Where reference is made to a particular embodiment of the invention, the embodiment is identified with a suffix to the reference numeral.

Referring to FIG. 1, the apparatus 10.1 includes a rotor 12 that is supported to rotate about a generally horizontal rotational axis 14 in a rotation direction. The rotor 12 is supported by a support structure (not shown in FIG. 1) and it can rotate about a shaft that extends along the rotational axis 14, on bosses or bearings or the like. The rotor 12 is mechanically connectable to an unlimited number of driven devices, which can receive rotational energy from the rotor to perform useful functions. Persons skilled in the art would appreciate how varied the uses are, for rotational power from the rotor 12, but by way of non-exhaustive example, it includes driving mechanical machines such as winches, pumps, etc. and includes driving generators or like machines, for converting rotational power from the rotor into electricity. The output from such machines can be applied immediately (e.g. when a machine is driven to perform a mechanical task), can be converted to different forms of energy (e.g. by generating electricity), and/or can be accumulated or stored, e.g. by pumping a fluid to a higher elevation from where it's potential energy can be harvested in future (e.g. with turbines).

The rotor 12 includes a thirty hollow elements in the form of tubes 18 that are arranged to rotate along with the rest of the rotor, the tubes being mounted between two spoked wheels 20 and having their ends closed off with caps 21. Each tube 18 has a cylindrical outer wall 22 and defines a cavity on its inside.

The shape and configuration of the rotor 12 and its means for defining cavities, can vary greatly, e.g. the cavities can be formed in a unitary body, there can be any number of cavities from two, different shaped hollow elements can be used to form the cavities, etc. However, at least some of the cavities must be defined at different radial rotations relative to the rotational axis 14 in the rotation direction 16, and preferably at least two of the cavities should be defined on opposing sides of the axis—preferably, but not essentially, diametrically opposed. Preferably, the rotor should define a large number of cavities and they should be evenly distributed (circumferentially spaced) about the rotational axis 14.

Each tube 18 (and thus each cavity inside the tube) is spaced from the rotational axis 14, although some tubes are spaced further from the axis—at a greater radius.

Even though the parts of the rotor 12 that define the cavities, can have various configurations, using tubes 18 for this purpose is preferable because of the low cost of manufacturing the rotor, using commercially available tubing, the longitudinal scalability of the tubes, the avoidance of "dead spaces" between the tubes (see below), and the ease of operating longitudinally spaced valves on each tube (see below).

Each of the tubes 18 has a longitudinal row of trailing apertures 24 that extend from the cavity inside the tube in a direction opposite to the rotation direction 16, to the outside of the rotor 12. Each tube 18 need only have a single trailing aperture 24, but depending on operational parameters, it may be preferable to provide a plurality of trailing apertures.

The size of the trailing apertures 24 is relatively small in relation to the volume of the cavity inside the tube 18. The relative sizes of the trailing apertures 24 and tubes depend on the fluids for which they are intended and depend on the actual dimensions and operational parameters of the apparatus 10.1. Suffice it to say that the cross-sectional dimensions of the trailing apertures 24 are substantially less than the cross-sectional dimensions of the cavities inside the tubes 18.

The tubes 18 are configured to form six vanes 26, with five tubes in each vane. Each of the vanes 26 extends in a radial direction from the rotational axis 14 and the tubes 18 in each vane are attached to common spokes 28 on each of the wheels 20. The configuration of the vanes 26 can be varied in number of tubes 18, size, orientation, etc., as long as the vanes form surfaces that can receive an impingement load from a flowing fluid, to drive the rotor 12 to rotate about the rotational axis 14 (see below).

The tubes 18 are preferably spaced apart, to allow fluids to pass between them and to avoid dead spaces. The spaces between the tubes 18 potentially reduce the efficacy of the vanes 26, because some of a fluid impinging upon a vane will pass between the tubes 18 and not exert its full impinging potential on the vane. However, in the absence of spaces between the tubes 18, fluids vented from the trailing apertures 24 can get trapped between vanes, and inhibit rotation of the rotor.

The size of the rotor 12 and the relative sizes of its components, can be varied, depending on operational parameters when using the rotor.

Figure 2:
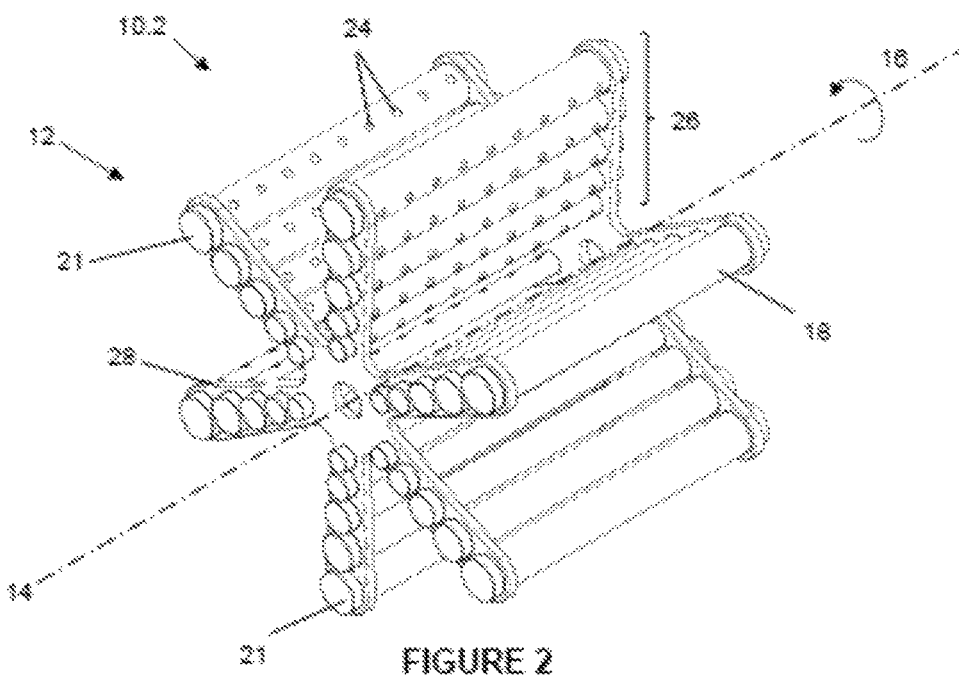
FIG. 2 shows a three-dimensional view of a second embodiment of apparatus according to the present invention.

Referring to FIG. 2, the apparatus 10.2 includes a rotor 12 is shown with a rotational direction 16 that is opposite from that shown in FIG. 1. The tubes 18 are supported in spokes 28, but the spokes do not form part of wheels and the diameters of the tubes are smaller closer to the rotational axis 14, than the tubes at greater radii. The variation in tube diameter is merely intended to ensure adequate free space around the tubes 18 closer to the rotational axis 14, to prevent dead space.

Figure 3:
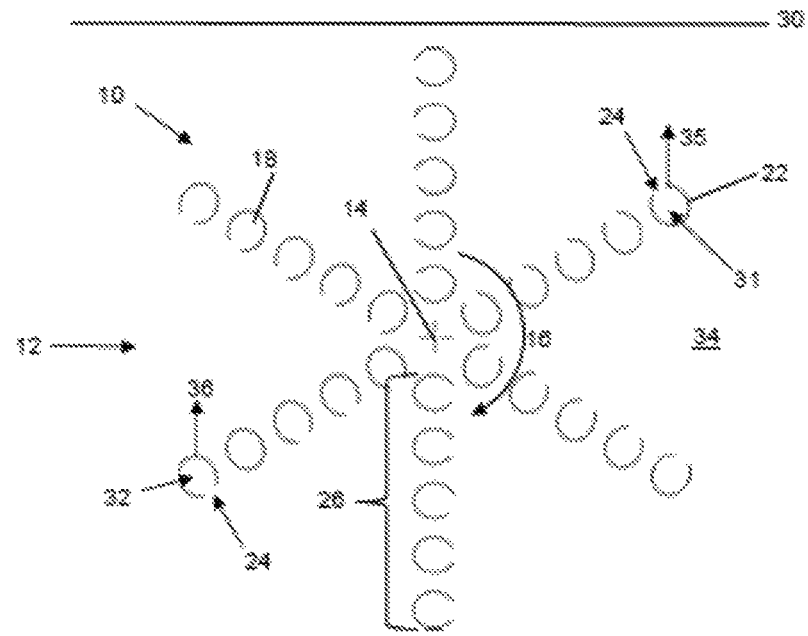
FIG. 3 shows a diagrammatic sectional view in a longitudinal direction, through hollow elements of the apparatus of FIG. 1, in a submerged mode.
Figure 4:
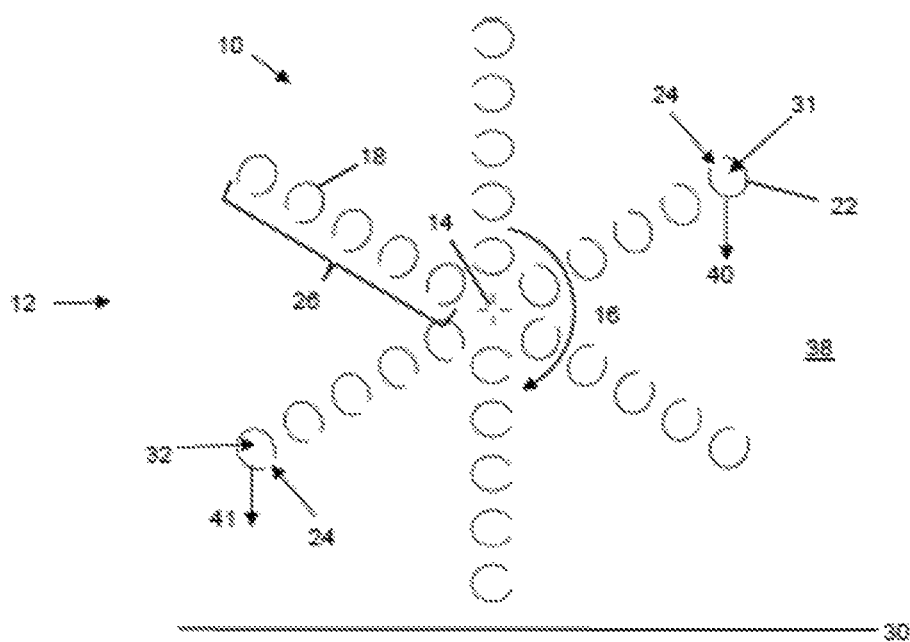
FIG. 4 shows a diagrammatic sectional view in a longitudinal direction, through hollow elements of the apparatus of FIG. 1, in an elevated mode.
Figure 5:
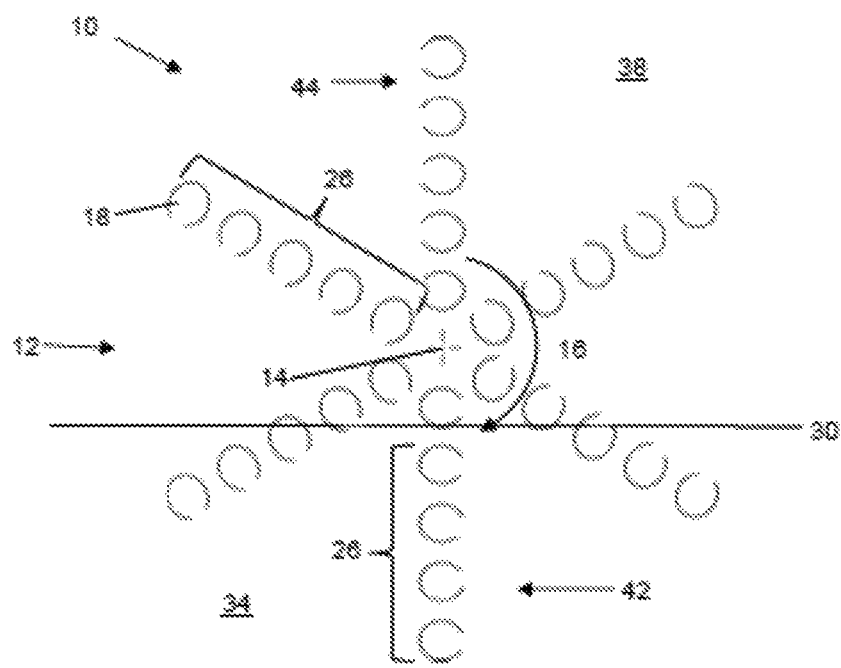
FIG. 5 shows a diagrammatic sectional view in a longitudinal direction, through hollow elements of the apparatus of FIG. 1, in a part-submerged mode, receiving impinging forces from fluid flows.

Referring to FIGS. 3 to 5, the support structure supporting each rotor 12 is configured to support the rotor so that is selectively above and below a boundary formed between two fluids of different density. The invention is not limited to any fluids (not even to compressible or incompressible fluids), but in most scenarios, it is likely to be implemented for use with water as the higher density fluid, air as the lower density fluid and the water surface as the boundary between the two fluids. Without limiting the scope of the invention, reference will be made herein below to water 34 and air 38 as representative examples of high and low density fluids.

The support structure should preferably be configured to support the rotor 12 so that it is selectively, preferably sequentially, completely submerged in the water 34 and completely elevated in the air 38 above the water surface. However, in some embodiments, it may be preferable that the rotor 12 remain partially submerged for part or all of its use. However, it is still essential for purposes of the present invention that the rotational axis 16 is at least occasionally above and below the water surface 30.

Supporting the rotor 12 to be sequentially above and below the water surface 30 can be achieved in various ways: it can be the result of varying water levels, e.g. as a result of tidal variations in water levels or variations in water levels resulting from wave action. However, it can also result from adjustment of the support structure (i.e. a support structure configured to lift and lower the rotor 12), or from other relative motion between the support structure and the water surface—e.g. the rotor can be supported stationary relative to the hull of a water borne vessel, which rocks while afloat in waves.

The rotor 12 can operate in various modes, including: a submerged mode in which it is in a submerged position in which preferably the entire rotor is submerged under the water surface 30, as shown in FIG. 3; an elevated mode in which it is in an elevated position in which preferably the entire rotor is elevated above the water surface, as shown in FIG. 4; and a part-submerged mode in which substantial parts of the rotor are above and below the water surface, respectively. There are also other variations on these modes of operation, in which the water surface 30 can be anywhere in relation to the rotor 12, but operation of the rotor by mass displacement (as will be described below) requires submersion and elevation of the rotor, at least to some degree and as a minimum, its rotational axis 14 should be sequentially submerged below and elevated above the water surface.

Referring to FIG. 3, For purposes of explanation, one of the cavities 31 will be regarded as a "first cavity" of the rotor 12 and a cavity 32 that is diametrically opposed to the first cavity, will be regarded as the "second" cavity. However, depending on the positions of any of the other cavities of the rotor 12—to the left or to the right of the rotational axis 14, those cavities would operate the same way as the first and second cavities.

When the rotor 12 is initially submerged from above the water surface 30, each of the cavities 31,32 is filled to some extent, preferably entirely with air and for purposes of explanation, it will be assumed that they are all completely filled with air. For simplicity of explanation, it is assumed that the first and second cavities 31,32 are of equal shape and size and they are spaced equally far from the rotational axis 14—that is the case in the illustrated example, but it need not be the case in other embodiments of the invention.

The trailing aperture 24 of the second cavity 32 is directed downwards, so that the air inside the second cavity is held captive inside the second cavity. The air in the second cavity 32 is lighter than the water 34 surrounding the rotor 12 and as a result, the air inside the second cavity exerts an upward buoyant force 36.

The trailing aperture 24 of the first cavity 31 is directed upwards, so that air can escape from the first cavity, through the trailing aperture and some of the surrounding water 34 can enter the first cavity 31 via its trailing aperture. The inflow of water 34 into and venting of air from the first cavity 31 increases the overall density of contents inside the first cavity. The contents inside the first cavity 31 could change from being made up entirely of air to being made up entirely of water, or could be a mixture of air and water. The increase in density of the contents inside the first cavity reduces the buoyancy of the first cavity in the surrounding water 34 and reduces an upward buoyant force 35 exerted by the contents of the first cavity.

Initially, when the first cavity 31 is filled with air, the density of its contents is the same as that of the second cavity 32 and the upward buoyant forces 35,36 exerted by the air inside each of these cavities 31,32, are in balance. However, as the density of the contents of the first cavity 31 increases, so its buoyant force 35 will be reduced and the stronger buoyant force 36 from the second cavity 32 will dominate so that the resultant difference between the buoyant forces will exert a moment on the rotor 12, causing it to rotate in the rotation direction 16.

Depending on the exact physical configurations of the cavities and their trailing apertures 24, the cavities inside each of the tubes 18 on the right of the rotational axis 14, as shown in FIGS. 3 to 5, could have an upwardly extending trailing aperture and could function like the first cavity 31. Similarly each of the cavities in tubes 18 to the left of the rotational axis 14 could function like the second cavity 32.

The rotation of the rotor 12 in the rotational direction 16 could continue for more than one rotation, while air escapes from cavities in tubes 18 to the right of the rotational axis, until all air has escaped and the tubes are filled with water, or until only a small volume of air remains in each tube. In some embodiments, the rotation could end when some tubes 18 contain substantially more air than others and the tubes with more air are at the top of the rotor 12, but preferably, the tubes and trailing apertures 24 are configured to maximise rotation of the rotor and venting of air from the cavities over several revolutions of the rotor 12.

Air escaping from the trailing apertures 24 of the tubes 18 to the right of the rotational axis (including the first cavity 31) forms bubbles that travel upwards to the water surface 30 by virtue of their buoyancy. However, if dead spaces are formed in the rotor 12 where these bubbles could get trapped, the buoyant forces of these bubbles would drive the vanes 26 and/or tubes 18 on the right, upwards, against the rotation direction 16 and would thus reduce the efficiency of the rotor 12. This is why it is preferable that the tubes 18 should be spaced apart, leaving spaces between them through which air bubbles can travel to the water surface 30.

For the purposes of explanation and as illustrated in the drawings, the tubes 18 and their cavities are geometrically mirrored about the rotational axis 14. However, in other embodiments, the sizes of cavities, their radial orientation in the rotation direction 16 and their spacing from the rotational axis, may vary—as long as the combined moment about the rotational axis 14, of all the volumes of the cavities, respectively to the left and the right of the rotational axis, are balanced, irrespective of the rotation of the rotor 12.

Referring to FIG. 4, when the rotor 12 operates in its elevated mode, above the water surface 30, it can for ease of explanation be presumed to have the same orientation as that shown in FIG. 2 and when the rotor is initially elevated from below the water surface, each of the cavities 31,32 is filled to some extent, preferably entirely, with water and for purposes of explanation, it will be assumed that they are all completely filled with water The trailing aperture 24 of the first cavity 31 is directed upwards, so that the water inside the first cavity is held captive inside the first cavity. The water in the first cavity 31 is heavier than the air 38 surrounding the rotor 12 and as a result, the water inside the first cavity exerts a downward gravitational force or weight 40.

The trailing aperture 24 of the second cavity 32 is directed downwards, so that water can escape from the second cavity, through the trailing aperture and some of the surrounding air 38 can enter the second cavity 32 via its trailing aperture. The inflow of air 38 into and draining of water from the second cavity 32 reduces the overall density of contents inside the second cavity. The contents inside the second cavity 32 could change from being made up entirely of water to being made up entirely of air, or could be a mixture of air and water. The decrease in density of the contents inside the second cavity reduces the downward gravitational force or weight 41 exerted by the contents of the second cavity.

Initially, when the second cavity 32 is filled with water, the density of its contents is the same as that of the first cavity 31 and the weights 40,41 exerted by the water inside each of these cavities 31,32, are in balance. However, as the density of the contents of the second cavity 32 decreases, so its weight 41 will be reduced and the stronger weight 40 from the second cavity 32 will dominate so that the resultant difference between the weights will exert a moment on the rotor 12, causing it to rotate in the rotation direction 16.

The rotation of the rotor 12 in the rotational direction 16 could continue for more than one rotation, while water drains from cavities in tubes 18 to the left of the rotational axis 14, until all water has drained and the tubes are filled with air, or until only a small volume of water remains in each tube. In some embodiments, the rotation could end when some tubes 18 contain substantially more water than others and the tubes with more water are at the bottom of the rotor 12, but preferably, the tubes and trailing apertures 24 are configured to maximise rotation of the rotor 12 and draining of water from the cavities.

Water escaping from the trailing apertures 24 of the tubes 18 to the left of the rotational axis (including the second cavity 32) travel downwards under gravity to the water surface 30 and like the air bubbles mentioned with reference to FIG. 3, the drained water would drive the vanes 26 and/or tubes 18 on the left downwards, against the rotation direction 16 if it were trapped in dead spaces in the rotor 12 and would thus reduce the efficiency of the rotor. However, the drained water can pass through spaces between adjacent tubes 18, without significantly affecting rotation of the rotor.

The submerged and elevated modes of operation of the rotor 12, described with reference to FIGS. 3 and 4, rely on mass displacement from cavities in the rotor, during its rotation, but the mass displacement requires simultaneous out-flow and in-flow of fluids through the trailing apertures 24. If the trailing apertures 24 are too small, this counter-flow of fluids would cause either or both of the fluid flows to become throttled and insufficient mass displacement would take place. If the trailing apertures 24 are too large in relation to the volumes of the cavities inside the tubes 18, then the mass displacement would be too rapid and rotation of the rotor 12 would cease prematurely (before venting sufficient air or before draining sufficient water).

Referring to FIG. 5, the rotor 12 is shown submerged about one third of its height, in the water 34, with its upper two thirds protruding above the water surface 30 in the air 38. The rotor 12 may be driven as described with reference to FIG. 4 (in elevated mode), may have rotational momentum as a result of being driven previously in submerged or elevated mode (as shown in FIGS. 3 and 4), may be in a transition between being driven in elevated or submerged mode, or the like.

The water 34 could flow in a direction from right to left, as shown in FIG. 5 as a result of gravitational flow (e.g. a river), flow from wave action, and/or tidal flow and the flowing water would impinge on the tubes 18 that are submerged, to drive the rotor 12 to rotate in the rotation direction 16. This impingement of the flowing water 42 on the rotor 12 is made more effective by the arrangement of the tubes 18 in vanes 26.

Similarly, the air 38 could be moving as wind 44 from left to right, above the water surface 30 an would impinge on the tubes 18 and vanes 26 above the water level, driving the rotor 12 to rotate in the rotational direction 16. However, to use impingement from the wind 44 on the vanes 26 more efficiently, it would be preferable if the wind only impinges on the tubes 18 above the water surface 30.

Impingement on the tubes 18 and vanes 26 by water flow 42 below the water surface 30 and the impingement on the tubes and vanes by wind 44 above the water surface, could take place simultaneously, in opposing directions (as shown in FIG. 5), or only one of these two fluids could be flowing at a time—the two fluid flows have merely been illustrated in a single drawing, for the sake of brevity.

The modes of driving the rotor 12 to rotate in the rotation direction 16 by impingement of fluids, described with reference to FIG. 5, operate independently of the submerged and elevated modes of operation (which rely on mass displacement) and the impingement and mass transfer modes of operation can operate separately or simultaneously. Ideally, the support structure is configured so that different modes of operation of the rotor 12 would drive it in the same rotational direction and for this purpose, water flows 42 and/or wind 44 can be redirected to drive the rotor in the same rotation direction 16 as the mass transfer modes of operation.

Figure 6:
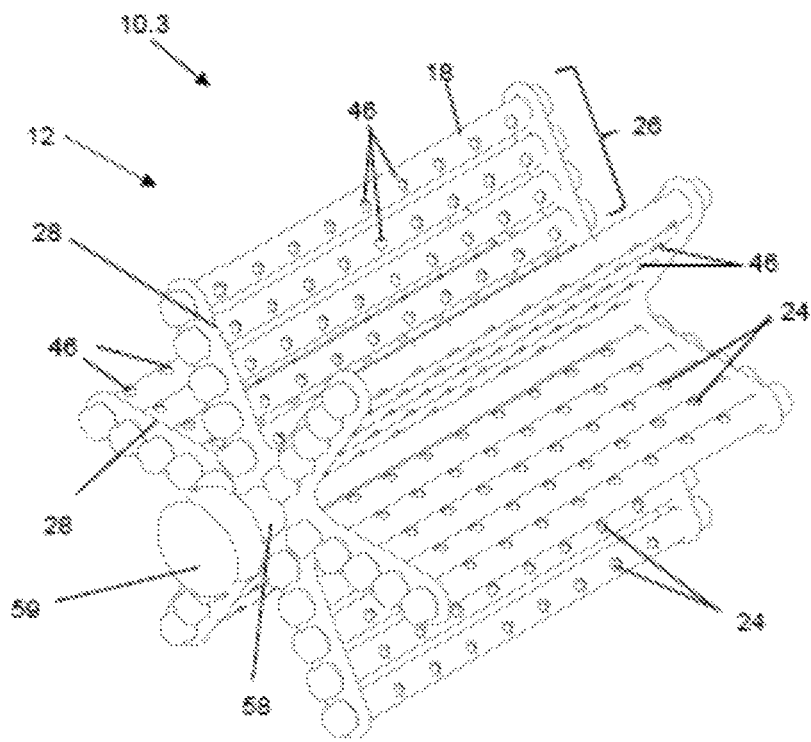
FIG. 6 shows a three-dimensional view of a third embodiment of apparatus according to the present invention.
Figure 7:
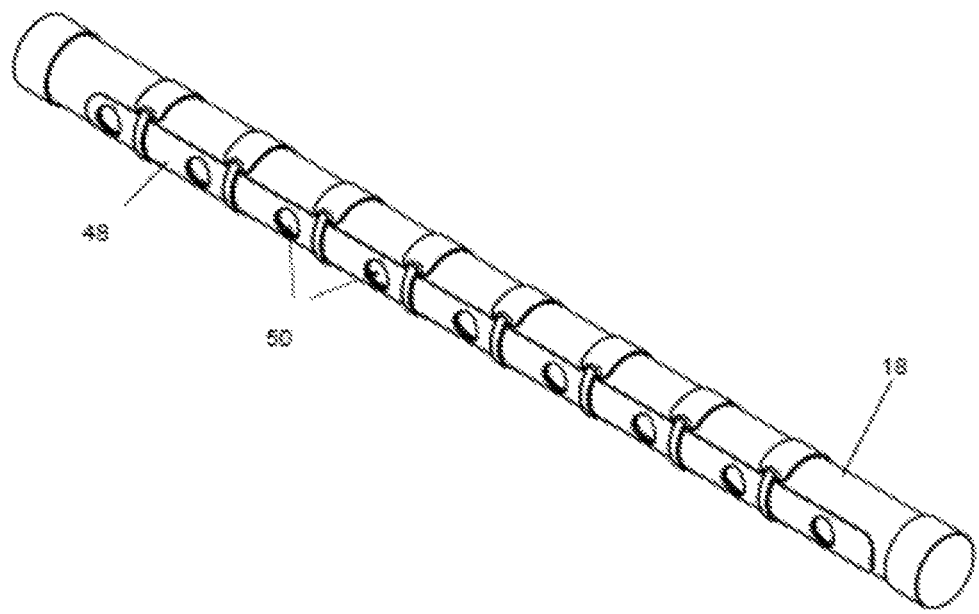
FIG. 7 shows a three-dimensional view of a hollow element of any of the embodiments of the present invention shown in FIGS. 1, 2 and 6, with a first embodiment of valves on apertures defined in the wall of the hollow element.
Figure 8:
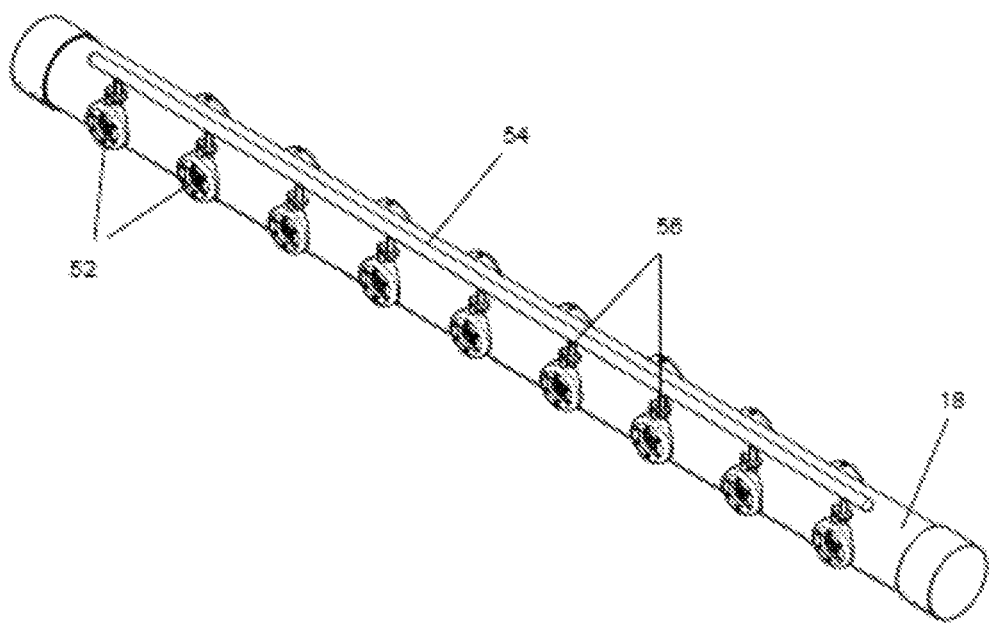
FIG. 8 shows a three-dimensional view of a hollow element of any of the embodiments of the present invention shown in FIGS. 1, 2 and 6, with a second embodiment of valves on apertures defined in the wall of the hollow element.

Referring to FIGS. 6 to 8, in addition to trailing apertures 24, each tube 18 can also have leading apertures 46 on its opposite side and the leading apertures or all apertures can be configured to be opened and closed, e.g. with valves. Various configurations of valves can be used and they can be operated in manual, semi-automated or fully automated manners. Preferably, the operation of the valves is fully automated and is controlled remotely, with mechanical actuation affected on the rotor 12, e.g. with solenoids (not shown) that are on the rotor 12.

The rotor 12 shown in FIG. 6 includes a shaft 58 with a pulley 59 at its end, from which rotational power can be transferred with a belt or the like.

FIG. 7 shows a tube 18 to which a gate element 48 has been strapped, that can slide longitudinally along the tube to operate as a common slot valve for a row of apertures 24,46. A row of gate apertures 50 are defined in the gate element 48, which can be in register with the apertures 24,46 when the valves are open, or the gate element can be slid longitudinally so that the gate apertures 50 and apertures 24,46 of the tube 18 are not aligned and the valves are closed. The simplicity of construction and operation of this slot valve mechanism and the ease with which the single gate element 48 can be operated by a single solenoid to open and close all the apertures 24,46, make the slot valve ideally suited for the present invention.

FIG. 8 shows a tube 18 with butterfly valves 52 on each or its leading and trailing apertures 24,46 and a row of the butterfly valves on one side of the tube are operated together with a common push-rod 54 that is connected to individual crank arms 56 of each butterfly valve.

The valves 48,52 allows the trailing apertures 24 to be closed selectively and the leading apertures 46 to be opened, so that the rotor can operate in the mass transfer modes as described above with reference to FIGS. 3 and 4, except that the rotation direction 16 will have been inverted and the leading apertures 46 will act as trailing apertures. Accordingly, the selective opening and closing of the leading and trailing apertures 24,46, respectively, allows the operation of the rotor 12 to be inverted in mass transfer mode. This can be used if a flow of water 42 or a wind direction 44 has changed, e.g. if the impingement of the water 42 and/or wind 44 on the vanes 26 drives the rotor 12 in the opposite rotation direction 16, then this inversion can be used so that the rotor will also be driven in the opposite direction in the mass displacement modes of operation.

The valves 48,52 also allows both the leading and trailing apertures 24,46 to be opened on the tubes that are venting air in the submerged mode or that are draining water in the elevated mode, so that fluids can flow into each cavity from one side and out the other side, simultaneously, thus increasing the rate at which air is vented or water is drained from the cavity, as the case may be. This would only be done temporarily, while a tube 12 is on the side of the rotor 12 where mass displacement takes place, and the trailing apertures 24 would be closed again while the tube is on the side of the rotor where no mass displacement takes place. The leading apertures 46 would thus be opened and closed cyclically with rotation of the rotor 12 and this cyclical operation of the leading apertures can be affected by simple mechanical means, such as a cam adjacent the rotor.

The ability to open the leading apertures 46 thus overcomes the difficulties caused by counter-flow of fluids that can throttle flow through the trailing apertures 24, as described above. In addition, the ability to open and close the leading apertures 46 selectively, means that this can be done when more rapid mass transfer is required, but the leading apertures and/or trailing apertures 24 can be closed completely or partially when slower mass transfer is required.

Figure 9:
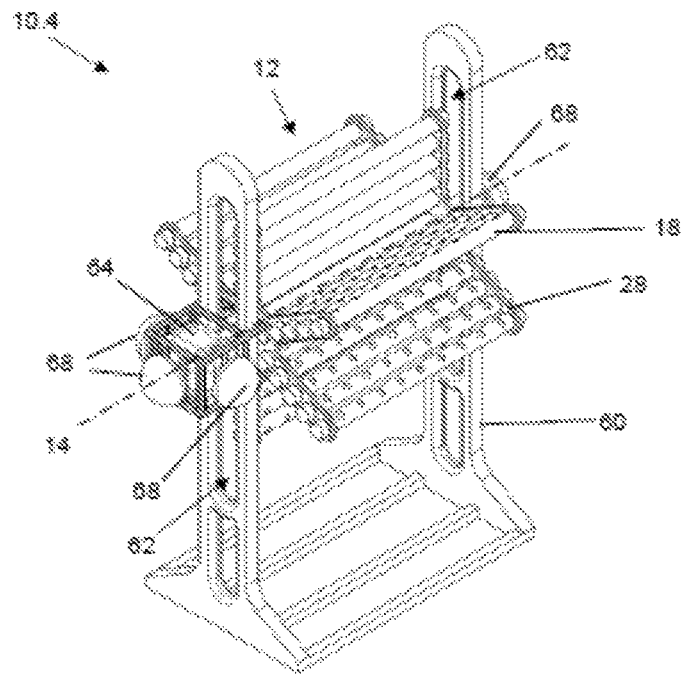
FIG. 9 shows a three-dimensional view of a fourth embodiment of apparatus according to the present invention.
Figure 10:
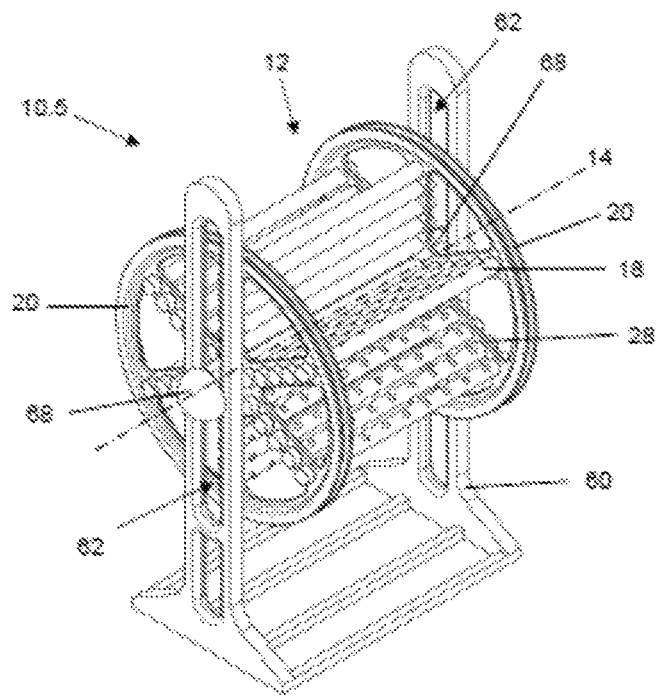
FIG. 10 shows a three-dimensional view of a fifth embodiment of apparatus according to the present invention.
Figure 11:
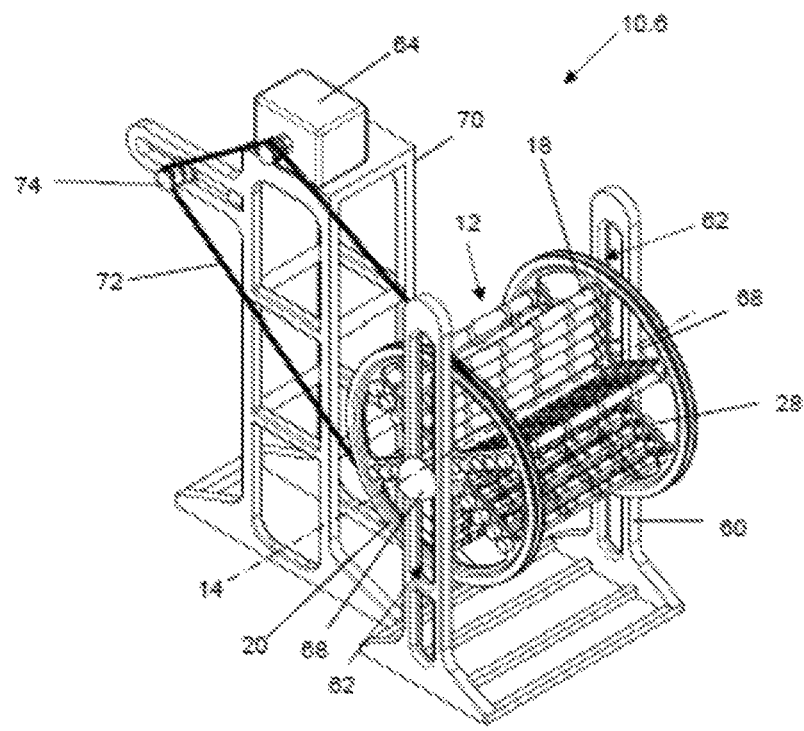
FIG. 11 shows a three-dimensional view of a sixth embodiment of apparatus according to the present invention.

Referring to FIGS. 9 to 11, apparatus 10 is shown in each of these drawings, which includes a rotor 12, substantially as shown in FIGS. 1 and 2, with a support structure that includes a stand 60. Each rotor 12 is supported on a shaft along its rotational axis 14 and the opposing ends of each shaft are supported by the stand 60, but each stand defines vertical slots 62 in which the ends of the shaft can slide vertically, to move the rotor 12 up and down.

The configurations of support structures that can be used to support the rotors 12 in use, are unlimited and the structures can be geo-stationary (such as the stands 60), could be supported from other objects, could float, or the like. Further, the stands 60 shown in the drawings, each allow for vertical displacement of the rotor 12 along the slots 62, but in other embodiments, the rotors can be moved vertically in various other ways or their height could be fixed.

None of the rotors 12 shown in FIGS. 9 to 11 have leading apertures in their tubes 18, but this is mere co-incidence and rotors with leading apertures could be used in any of these embodiments. Further, only the rotor 12 in FIG. 11 has valves on its trailing apertures 24, but this is also mere coincidence and the rotors shown in FIGS. 9 and 10 could also have valves.

Referring to FIG. 9, a sealed alternator 64 is provided on one end of the rotor's shaft 58 and is configured to generate electricity from rotation of the rotor—thus avoiding the need to transfer motive power from the apparatus 10.4. Floats 68 are provided to provide buoyancy to control the elevation of the rotor 12 (see below) and the floats include; floats at either end of the rotor and two floats on opposing sides of the alternator 64 to compensate for the weight of the alternator.

Referring to FIG. 10, the rotor 12 includes wheels 20 and each wheel has a groove in its outer circumference in which a belt or other flexible transfer element is receivable, to transfer motive power from the wheel to driven equipment. The rotor 12 has floats 68 at each end.

Referring to FIG. 11, apart from having valves, the rotor 12 and stand 60 are identical to those shown in FIG. 10, but in addition, the apparatus 10.6 includes an alternator 64 supported on an alternator stand 70, which is driven from one wheel 20 of the rotor 12 with a belt 72. Tension on the belt 72 is maintained by way of an idle pulley 74, which can slide horizontally in the alternator stand 70. However, in other embodiments, actuated horizontal sliding of the idle pulley 74 can be used to raise and lower the rotor 12, instead of or in addition to the floats 68.

Referring to FIGS. 9 to 11, the vertical position (elevation) of each rotor 12 can be controlled by actuation (e.g. by movement of the idle pulley 74), or by controlling the buoyancy of the floats 68. In a preferred embodiment, the buoyancy of the floats 68 is controlled by timing the opening and closing of valves on the floats to vent air and allow water into the float, to drain water and allow air into the float, or to maintain the contents and thus the density of the float.

When the predominant mode of operation of the rotor 12 is impinging flow, whether from water flow 42, or wind 44, it would be desirable to maintain the rotor at an optimal elevation in relation to the water surface 30, irrespective of varying water levels from tides and/or waves. In particular, when impingement from water flow 42 is the predominant motive power for the rotor 12, then it is preferable to keep the rotor submerged about one third of its height (as shown in FIG. 5). Accordingly, in these circumstances, it would be preferable to allow the rotor 12 to move up and down along the slots 62 as the water level changes and this can be achieved if the floats 68 have the correct buoyancy to maintain the rotor 12 at the optimal depth.

Operation of the rotor 12 by mass displacement can only last for a finite period after each change between submerged and elevated positions and the rotor performs optimally in mass displacement mode when it is completely elevated or completely submerged, sequentially. Complete submersion of the rotor 12 can be achieved by venting air from the floats 68 so that they lose buoyancy and the rotor "sinks", but complete elevation of the rotor cannot be achieved by controlling the buoyancy of the floats alone. Instead, or in addition, submersion or elevation of the rotor 12 can be achieved by allowing the rotor to raise and fall with changes in water level 30 and to lock the vertical position of the rotor selectively, while allowing the water level to raise over the rotor or to drop below the rotor.

The operation of the apparatus 10 is preferably controlled remotely by a computer, but this need not be the case. Further, the operation of the apparatus 10 can be optimised for each location and can be adapted to make optimal use of the energy available—which will change over time in most instances. In particular, some forms of energy that can be harvested by the apparatus 10 is relatively predictable, such as tidal flows. Other sources of energy may be less predictable, but can be moderated, e.g. the flowrate of a river may not be predictable, but a predetermined portion of the flow can be channeled to provide a predetermined flowrate, or wind of which the direction is unpredictable, can be channeled to impinge on the rotor 12 in a preferred direction. However, some sources of energy are more difficult to predict, e.g. wave height and wind strength and to make optimal use of these energy sources, operation of the apparatus 10 may need to be adapted on demand. One of the benefits of the present invention is the versatility of the apparatus 10 to harvest energy from moving fluids in various modes.

By way of example, the apparatus 10 can be installed in a location where the rotor is exposed to waves and tides—which can be supplemented with wind action, but wind action is omitted from this example, for brevity. If there is no significant wave action, but there are significant tidal flows of water, then air can be partly vented from the floats 68 to support the rotor 12 submerged one third of its height (irrespective of the water level) and it will be rotated by impingement of the tidal flow 42 on the vanes 26.

As the tide approaches low tide, the rotor 12 can be locked against downward sliding in the slots 62 while the water level drops further as the tide recedes to low tide. This would allow water from the floats to be drained under gravity if their buoyancy needs to be increased. In addition, locking the rotor 12 against downward sliding will allow it to become elevated above the water level 30 as the tide recedes, so that it can operate in elevated mode (as shown in FIG. 4). The operation in elevated mode can thus take place around low tide, when the tidal flow is relatively small.

Once the water has drained from the cavities in the tubes 18 in the elevated mode, the rotor 12 can be released to slide downward along the slots 62 under gravity and air can be vented from the floats 68 (if required) so that the rotor is again supported by buoyancy of the floats, at a suitable level to harvest energy from the tidal flow 42, which would become stronger about midway between low tide and high tide.

As the tide approaches high tide, the rotor 12 can be locked against upward sliding in the slots 62 while the water level continues to rise to high tide and the water submerges the rotor. While submerged, the rotor 12 can operate in submerged mode (as shown in FIG. 3)—which will take place around high tide, when the tidal flow is relatively small.

Once the air has been vented from the cavities in the tubes 18 in the submerged mode, the rotor can be released to slide upwards along the slots 62 under buoyancy of the floats 68, to resume its elevation relative to the water level 30 where it can harvest the receding tidal flow.

In the event that wave action increases to the extent that more energy can be harvested from wave action than from the tidal flow, then the rotor 12 can be locked in relation to the slots 62 at an elevation midway between the peaks and troughs of the waves (and this will require occasional adjustment to compensate for tidal changes in mean water levels). As the waves wash over the apparatus 10, the rotor 12 is alternately submerged in wave peaks and elevated above wave troughs and it operates alternately in submerged and elevated mode. If required, the valves on the trailing apertures 24 can be opened to increase the rates of mass transfer, in view of the frequency of the waves that is far higher than the frequency of tides and the rates of mass transfer need to keep pace with this increased frequency to harvest wave energy optimally. If the rotor 12 has leading apertures 46, they can also be opened selectively to increase mass transfer rates, as described above.

Figure 12:
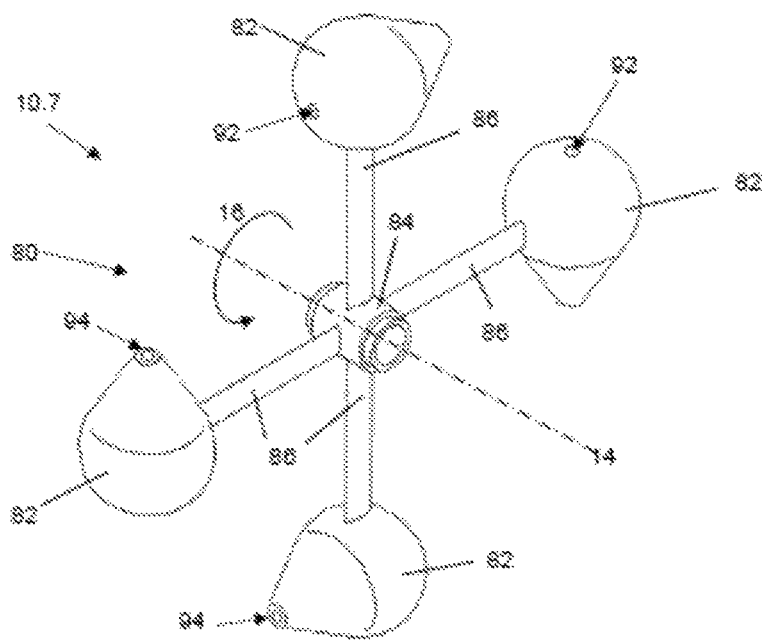
FIG. 12 shows a three-dimensional view of a seventh embodiment of apparatus according to the present invention.
Figure 13:
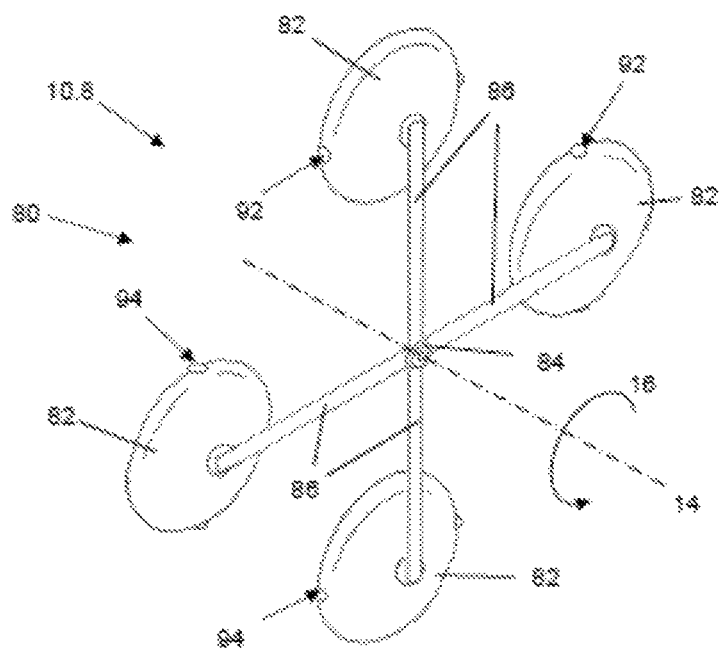
FIG. 13 shows a three-dimensional view of an eighth embodiment of apparatus according to the present invention.

Referring to FIGS. 12 and 13, apparatus according to the seventh and eighth embodiments of the present invention, each includes a rotor 80 comprising four chambers 82 that are attached to a hub 84 with hollow conduits 86. Each chamber 82 is hollow and defines an internal cavity and each conduit 86 defines an internal passage that is in flow communication with the cavity inside the chamber 82 on that conduit and with an inside of the hub 84—which is hollow. The inside of the hub 84 is connected via a drain channel (not shown) to a low density fluid, with an inlet of the drain channel at the hub and an outlet of the drain channel at an elevation that is preferably lower than the hub (and the rotational axis) and certainly not higher.

The rotor 80 is supported by a support structure (not shown), submerged inside a body of high density fluid to rotate about a generally horizontal rotational axis 14 in a rotation direction 16. The apparatus 10.7 and 10.8 can be used in various fluids, but its use is described herein with reference to a high density fluid in the form of water and a low density fluid in the form of air. Since the rotor 80 is supported submerged in the water and the drain channel extends from the hub to air that is lower than the hub, it follows that there must be air adjacent the water and this embodiment of the present invention is suitable for use in bodies of water where there is air adjacent the water, such as dams or reservoirs, where the rotor 80 can be submerged in the dam or reservoir and the drain channel can extend from the hub 84 through a wall of the dam or reservoir, to a position outside the wall.

The four chambers 82 are at different radial orientations relative to the rotational axis 14 and in each of the illustrated examples, the four chambers are spaced apart at right angles. However, for optimal operation of the rotor 80, more chambers would typically be provided that are spaced about the axis 14. Also, the conduits 86 are shown with equal lengths in FIGS. 12 and 13, but this need not be the case and the rotor 80 can include several chambers 82 at different radii from the axis 14.

The chambers 82 shown in FIG. 12 are generally teardrop-shaped, with rounded leading ends and conical trailing ends, whereas the chambers shown in FIG. 13 are generally disc shaped. In both cases, the chambers have been shaped to minimise their resistance to water, while rotating about the axes 14.

Figure 14:
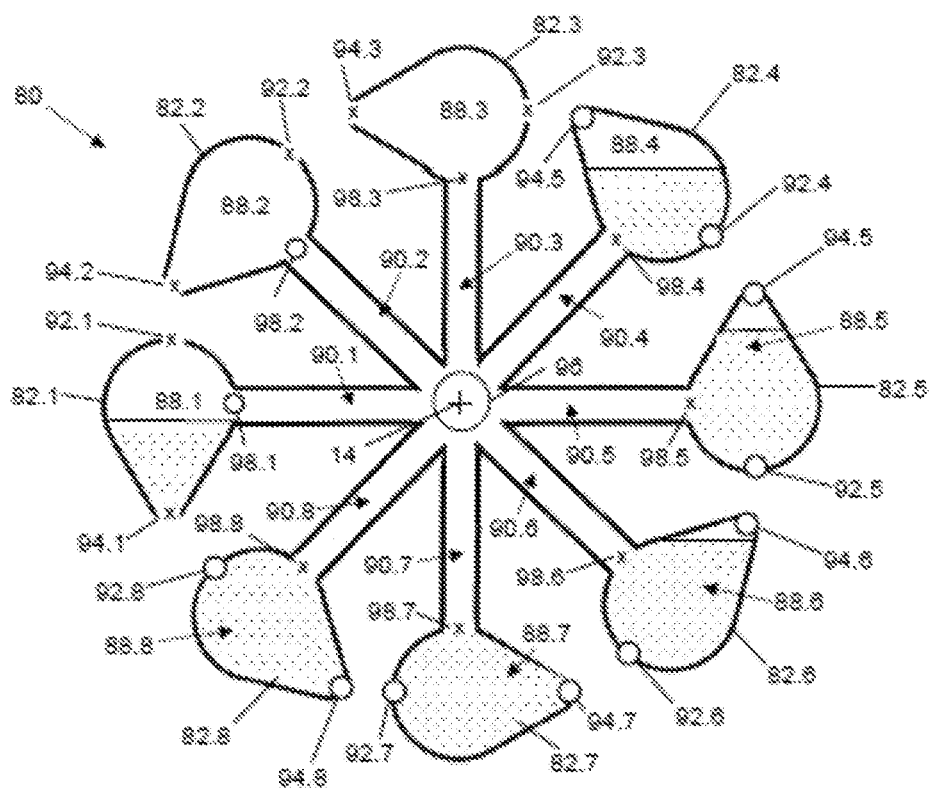
FIG. 14 shows a cross-sectional diagrammatic view of the apparatus of FIG. 12, in use.

Referring to FIG. 14, a diagrammatic representation is shown of a rotor 80 that includes eight of the chambers 82 and eight of the conduits 86 as shown in FIG. 12. The chambers 82 and conduits 86 are preferably configured in a staggered arrangement (akin to two of the rotors of FIG. 12 in a staggered, side-by-side arrangement).

Inside each chamber 82, a cavity 88 is defined and in each conduit 86, an internal passage 90 is defined that is in communication with the cavity inside the chamber attached to that conduit. Each chamber 82 also defines a leading aperture 92 and a trailing aperture 94, in leading and trailing positions, respectively, in relation to the rotation direction. The passages 90 join together at the hub 84 and extend from there along the common drain passage (not shown, but represented by a circle 96).

Each passage 90 can be selectively closed by a passage valve 98 that is preferably disposed adjacent the cavity 88. Further each leading aperture 92 has a leading aperture valve 92 and each trailing aperture has a trailing aperture valve 94, to open and close the leading aperture and the trailing aperture, respectively. (The leading aperture and leading aperture valve are both identified by reference numeral 92 and similarly, the trailing aperture and trailing aperture valve are both identified by reference numeral 94, to reduce clutter in FIG. 14.) Even though the chambers are identical, each of them are shown in FIG. 14 at a different stage of its revolution about the axis 14 and accordingly each chamber/position is identified by a suffix—which is also used to identify features of a particular chamber. The valves are shown in FIG. 14 as "X" when they are closed and as "O" when they are open.

In use, when a chamber 82 reaches the position shown as 82.1, its leading and trailing aperture valves 92.1 and 94.1 are closed and its passage valve 98.1 is opened. Its cavity 88.1 is thus placed in communication with its passage 90.1 and with the drain passage 96.1, so that any higher pressure inside the cavity 88.1 is released and its internal pressure is reduced to the ambient air pressure at the outlet of the drain passage 96. Also, water in the cavity 88.1 drains out under gravity via the passage 90.1 and drain passage 96 and is released from the drain passage outside the dam wall. The cavity 88.1 thus becomes rapidly filled with air and any water trapped in its trailing end is also rapidly drained as the chamber 82.1 rotates upwards.

When the chamber 82 has rotated to the position shown as 82.2, all water has drained from its cavity 88.2 and it is filled with air. The same remains true when the chamber 82 reaches position 82.3 at the top of the rotor 80. At this point, the passage valve 98.3 is closed and shortly after that, as the chamber 82 rotates towards the position shown as 82.4, its leading aperture valve 92.4 is opened, which causes water to flow into the cavity 88.4. It should be borne in mind that the water surrounding the rotor 80 is preferably under substantial pressure as a result of a head of water above it and the inflow of water into the cavity 88.4 via the leading aperture 92.4 increases the pressure inside the cavity 88.4 to equal the surrounding water pressure. Further to the inflow of water through the leading aperture 92.4, the trailing aperture valve 94.4 is also opened, which causes air to escape from the cavity 88.4 to the surrounding water. The net result of these steps, is that water flows into the cavity 88.4 quite rapidly and this continues as the chamber 82 rotates downwards through the positions shown as 82.5 and 82.6 to 82.7

During the rotation from the position at the bottom of the rotor 80 to the position at the left (shown as positions 82.7 to 82.1), nothing much happens in the chamber 82. The cavity 88 remains filled with water and the passage valve 98 remains closed until position 82.1 is reached.

If an entire rotor 80 is considered, bearing in mind that it has several chambers 82 at different positions about the axis 14, it can be seen in FIG. 14 that the total volume of water in the cavities 88.8, 88.1 and 88.2 to the left of the axis 14, is less than the total volume of water in the cavities 88.4, 88.5 and 88.6 to the right of the axis. This imbalance has the net result of a greater total weight of water in the right half of the rotor 80, than the total weight of water in the left half of the rotor, which causes a net downward gravitational force (weight) of the water in the right half, which in turn causes a moment that drives the rotor to rotate in the rotation direction 16.

The greater mass of water in the right half of the rotor 80 than the left half, is dependent upon rapid filling of the cavities 88 with water in positions 82.4 to 82.6, and this is achieved partly due to the elevated pressure of the water surrounding the rotor 80. The differential between total water volumes in cavities to the left and right of the axis 14 is also dependent upon rapid draining of water in positions 82.1 and 82.2, which is achieved through appropriately large bores of the passages 90 and drain passage 96.

Apart from the operation of the rotor 80 described above with reference to FIG. 14, the rotor can also operate the same way as the rotors 10 shown in FIGS. 1 to 11, if the passage valves 98 are kept closed—with the chambers 82 effectively performing the function of the tubes 18.

The invention claimed is:

1. An apparatus for harvesting energy from fluids, said apparatus comprising;
   a rotor; and
   a support structure supporting said rotor to rotate about a generally horizontal rotational axis of said rotor in a rotation direction, said support structure being configured such that said rotational axis is selectively, sequentially positioned above or below a boundary between two fluids of different density, such that the rotational axis is selectively, sequentially positioned in the fluid above said boundary or in the fluid below said boundary;
   said rotor including a plurality of hollow elements and each of the plurality of hollow elements having an elongate shape with a longitudinal axis that is parallel to the horizontal rotational axis of said rotor, and each of said hollow elements defining an internal cavity, said cavities including at least a first cavity inside a first one of the hollow elements at a first radial orientation relative to the rotational axis, and a second cavity inside a second one of the hollow elements at a second radial orientation relative to the rotational axis;
   said first radial orientation being spaced from said second radial orientation in the rotation direction;
   wherein said first hollow element defines a first trailing aperture extending from the first cavity in a direction opposite to the rotation direction, to an outside of the first hollow element, and the second hollow element defines a second trailing aperture extending from the second cavity in a direction opposite to the rotation direction, to the outside of the second trailing aperture;
   wherein said hollow elements are arranged at different radii and spaced from each other in a radial direction; and
   wherein the first trailing aperture and the second trailing aperture are permanently open and the first cavity and second cavity are each permanently sealed at leading sides of said cavities, said leading sides being opposite to the trailing opening of each cavity.

2. The apparatus according to claim 1, wherein said rotor defines a first leading aperture extending from the first cavity in the rotation direction, to the outside of the rotor, and a second leading aperture extending from the second cavity in the rotation direction, to the outside of the rotor.

3. The apparatus according to claim 1, which includes valves that are configured to open and close the first trailing apertures and the second trailing apertures, selectively.

4. A method of harvesting energy from fluids, said method comprising:
   providing the apparatus according to claim 1;
   supporting the rotor with the entire rotational axis sequentially above and below the boundary between the two fluids of different density, said rotor being in a submerged position when the entire rotational axis is below said boundary and in an elevated position when the entire rotational axis is above said boundary, said rotational axis being oriented transversely to a direction of flow of said higher density fluid;
   while the rotor is in the submerged position:
   positioning the rotor with the first cavity and the second cavity below said boundary and with the first trailing aperture directed upwards and the second trailing aperture directed downwards;
   holding the lower density fluid inside the second cavity and thereby maintaining a buoyant force exerted by said lower density fluid in the second cavity;
   allowing the lower density fluid to escape from the first cavity and the higher density fluid to enter the first cavity, via the first trailing aperture, thereby increasing the overall density of contents inside the first cavity and reducing a buoyant force exerted by the contents of the first cavity;
   exerting a moment on the rotor in the rotation direction, by applying the maintained buoyant force exerted by the lower density fluid in the second cavity and applying the reduced buoyant force exerted by the contents of the first cavity; and
   while the rotor is in the elevated position:
   positioning the rotor with the first cavity and the second cavity above said boundary and with the first trailing aperture directed upwards and the second trailing aperture directed downwards;
   holding the higher density fluid inside the first cavity and thereby maintaining a gravitational force exerted by said higher density fluid in the first cavity;
   allowing the higher density fluid to escape from the second cavity and the lower density fluid to enter the second cavity, via the second trailing aperture, thereby reducing the overall density of contents inside the second cavity and reducing a gravitational force exerted by the contents of the second cavity;

exerting a moment on the rotor in the rotation direction, by applying the maintained gravitational force exerted by the higher density fluid in the first cavity and applying the reduced gravitational force exerted by the contents of the second cavity.

5. The method according to claim 4, which includes exposing said rotor to a fluid flow which impinges on the rotor, said impinging fluid flow exerting a force on the rotor in an impingement direction that causes a moment on the rotor in the rotation direction.

6. The method according to claim 5, in which the impinging fluid flow is a flow of the low density fluid and said impinging fluid flow impinges the rotor above the rotational axis.

7. The method according to claim 5, in which the impinging fluid flow is a flow of the high density fluid and said impinging fluid flow impinges the rotor below the rotational axis.

8. The method according to claim 7, wherein the high density fluid is water and the impinging fluid flow is water moving by wave action.

9. The method according to claim 4, wherein said rotor defines a first leading aperture extending from the first cavity in the rotation direction, to the outside of the rotor, and a second leading aperture extending from the second cavity in the rotation direction, to the outside of the rotor, and the rotor includes valves that are configured to open and close the first and second leading apertures, selectively, said method including:

selectively opening the first leading aperture while the rotor is in the submerged position; and selectively opening the second leading aperture while the rotor is in the elevated position.

10. The method according to claim 4, wherein said rotor defines a first leading aperture extending from the first cavity in the rotation direction, to the outside of the rotor, and a second leading aperture extending from the second cavity in the rotation direction, to the outside of the rotor, and the rotor includes valves that are configured to open and close the first and second leading apertures and the first and second trailing apertures, selectively, said method including opening the leading apertures and closing the trailing apertures, selectively, to invert the rotation direction.

11. The apparatus according to claim 1, wherein the two fluids are water and air, the boundary between said fluids is a water surface, and the rotational axis is selectively above and below said water surface.

12. The apparatus according to claim 11, wherein the water surface is subject to wave action and the rotational axis is at an elevation that causes the rotational axis to be selectively above and below the water surface as a result of said wave action.

13. The apparatus according to claim 11, wherein the elevation of the water surface changes due to tidal action and the rotational axis is at an elevation that causes the rotational axis to be selectively above and below the water surface as a result of said tidal action.

14. The method according to claim 4, in which substantially the entire rotor is below said boundary when the rotor is in the submerged position and substantially the entire rotor is above said boundary when the rotor is in the elevated position.

15. An apparatus for harvesting energy from fluids, said apparatus comprising;

a rotor; and a support structure supporting said rotor to rotate about a generally horizontal rotational axis of said rotor in a rotation direction, said support structure being configured such that said rotational axis is selectively, sequentially positioned above or below a boundary between two fluids of different density, such that the rotational axis is selectively, sequentially positioned in the fluid above said boundary or in the fluid below said boundary;

said rotor including a plurality of hollow elements and each of the plurality of hollow elements having an elongate shape with a longitudinal axis that is parallel to the horizontal rotational axis of said rotor, and each of said hollow elements defining an internal cavity, said cavities including at least a first cavity inside a first one of the hollow elements at a first radial orientation relative to the rotational axis, and a second cavity inside a second one of the hollow elements at a second radial orientation relative to the rotational axis;

said first radial orientation being spaced from said second radial orientation in the rotation direction;

wherein said first hollow element defines a first trailing aperture extending from the first cavity in a direction opposite to the rotation direction, to an outside of the first hollow element, and the second hollow element defines a second trailing aperture extending from the second cavity in a direction opposite to the rotation direction, to the outside of the second trailing aperture;

wherein said hollow elements are arranged at different radii and spaced from each other in a radial direction; and wherein said plurality of hollow elements are arranged within the rotor as a plurality of groups, each of said groups being at a different radial orientation in the rotor, and the hollow elements in each of said groups being disposed at the same angular orientation, so that the hollow elements in each of said groups forms a virtual vane of parallel, radially spaced-apart hollow elements.

16. The apparatus according to claim 15, wherein said rotor defines a first leading aperture extending from the first cavity in the rotation direction, to the outside of the rotor, and a second leading aperture extending from the second cavity in the rotation direction, to the outside of the rotor.

17. The apparatus according to claim 15, which includes valves that are configured to open and close the first trailing apertures and the second trailing apertures, selectively.

* * * * *